(12) United States Patent
Laureano et al.

(10) Patent No.: US 11,585,277 B2
(45) Date of Patent: Feb. 21, 2023

(54) STIFFENED ROTOR SHAFT FOR A GAS TURBINE ENGINE

(71) Applicant: Raytheon Technologies Corporation, Farmington, CT (US)

(72) Inventors: Pedro David Laureano, Jacksonville, FL (US); Shu Liu, San Diego, CA (US)

(73) Assignee: Raytheon Technologies Corporation, Farmington, CT (US)

( * ) Notice: Subject to any disclaimer, the term of this patent is extended or adjusted under 35 U.S.C. 154(b) by 176 days.

(21) Appl. No.: 17/024,103

(22) Filed: Sep. 17, 2020

(65) Prior Publication Data

US 2022/0082054 A1    Mar. 17, 2022

(51) Int. Cl.
| | | |
|---|---|---|
| *F01D 5/06* | (2006.01) | |
| *F02C 7/36* | (2006.01) | |
| *F02K 3/06* | (2006.01) | |
| *F02C 3/04* | (2006.01) | |

(52) U.S. Cl.
CPC .................. *F02C 7/36* (2013.01); *F01D 5/06* (2013.01); *F02K 3/06* (2013.01); *F02C 3/04* (2013.01); *F05D 2220/323* (2013.01); *F05D 2220/36* (2013.01); *F05D 2240/35* (2013.01); *F05D 2260/40311* (2013.01)

(58) Field of Classification Search
None
See application file for complete search history.

(56) References Cited

U.S. PATENT DOCUMENTS

| | | | | |
|---|---|---|---|---|
| 3,296,886 | A  * | 1/1967  | Reinhart, Jr. ........... | F01D 5/282 74/572.21 |
| 3,525,575 | A  * | 8/1970  | Robert .................. | F01D 11/001 415/173.7 |
| 4,005,914 | A  * | 2/1977  | Newman ............... | F16C 17/024 384/103 |
| 6,551,057 | B1 * | 4/2003  | Haaser .................. | F01D 17/162 415/150 |
| 7,153,091 | B2   | 12/2006 | Stephenson et al. | |
| 10,190,495 | B2  | 1/2019  | Laureano et al. | |
| 10,392,939 | B2  | 8/2019  | McKay et al. | |
| 10,677,089 | B2  | 6/2020  | Lucey et al. | |
| 2009/0107237 | A1 * | 4/2009  | Ramlogan ............... | G01M 1/36 73/457 |
| 2010/0327588 | A1 * | 12/2010 | Macchia ................... | F02C 7/32 415/232 |
| 2015/0247454 | A1 * | 9/2015  | Laureano ................ | F02C 3/107 415/60 |
| 2016/0169012 | A1 * | 6/2016  | DaCunha ............... | C25D 5/022 427/443.1 |
| 2017/0122205 | A1 * | 5/2017  | Ertas .................... | F16C 33/1005 |
| 2017/0191416 | A1 * | 7/2017  | Amano ................... | F16C 3/02 |
| 2017/0218766 | A1 * | 8/2017  | Amano ................... | F01D 25/00 |
| 2018/0128180 | A1 * | 5/2018  | Durand .................... | F02C 7/20 |
| 2019/0316632 | A1 * | 10/2019 | Poteet ................... | F16C 33/043 |

* cited by examiner

*Primary Examiner* — Michael Lebentritt
(74) *Attorney, Agent, or Firm* — Bachman & LaPointe, P.C.

(57) ABSTRACT

A shaft for a gas turbine engine includes an inner contour with a stiffening rib that defines a stiffened wall thickness related to a nominal wall thickness according to a ratio between about 1.125-2.1.

19 Claims, 3 Drawing Sheets

STIFFENED ROTOR SHAFT FOR A GAS TURBINE ENGINE

BACKGROUND

This application relates generally to a gas turbine engine shaft and more specifically to a shaft with an internal stiffening structure.

Gas turbine engines, such as those that power modern commercial and military aircraft, generally include a compressor to pressurize an airflow, a combustor to burn a hydrocarbon fuel in the presence of the pressurized air, and a turbine to extract energy from the resultant combustion gases. Air entering the compressor section is compressed and delivered into the combustion section where it is mixed with fuel and burned to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the inner shaft. The shafts are required to meet the conflicting requirements of stiffness and low weight.

SUMMARY

A shaft for a gas turbine engine according to one disclosed non-limiting embodiment of the present disclosure includes an inner contour with a stiffening rib that defines a stiffened wall thickness related to a nominal wall thickness according to a ratio between about 1.125-2.1.

A further embodiment of any of the foregoing embodiments of the present disclosure includes that the stiffening rib is located axially proximate a second stage of a high pressure compressor.

A further embodiment of any of the foregoing embodiments of the present disclosure includes that the stiffening rib is located axially proximate a seventh stage of the high pressure compressor.

A further embodiment of any of the foregoing embodiments of the present disclosure includes that the stiffening rib is located axially proximate an eighth stage of the high pressure compressor.

A further embodiment of any of the foregoing embodiments of the present disclosure includes the stiffening rib is located axially proximate a seventh and an eighth stage of the high pressure compressor.

A further embodiment of any of the foregoing embodiments of the present disclosure includes that the stiffened wall thickness is between about 0.45-0.65 inches (11.43-16.51 mm).

A further embodiment of any of the foregoing embodiments of the present disclosure includes that the nominal wall thickness is between about 0.3-0.4 inches (7.62-12.7 mm).

A further embodiment of any of the foregoing embodiments of the present disclosure includes that the stiffening rib is a solid ring of material.

A further embodiment of any of the foregoing embodiments of the present disclosure includes that the stiffening rib comprises a multiple of longitudinal splines.

A further embodiment of any of the foregoing embodiments of the present disclosure includes that the stiffening rib is about 2-4 inches (50.8-101.6 mm) in axial length.

A further embodiment of any of the foregoing embodiments of the present disclosure includes that the stiffening rib comprises a forward and aft stiffening rib, wherein each stiffening rib is about 2-4 inches (50.8-101.6 mm) in axial length separated by between about 4-10 inches (101.6-254 mm).

A further embodiment of any of the foregoing embodiments of the present disclosure includes that the shaft is a low pressure turbine shaft.

A low pressure turbine shaft for a gas turbine engine according to one disclosed non-limiting embodiment of the present disclosure includes an inner contour with a forward stiffening rib located axially proximate a second stage of a high pressure compressor and an aft stiffening rib located axially proximate an eighth stage of the high pressure compressor.

A further embodiment of any of the foregoing embodiments of the present disclosure includes that the forward and aft stiffening rib are each about 2-4 inches (50.8-101.6 mm) in axial length separated by between about 4-10 inches (101.6-254 mm).

A further embodiment of any of the foregoing embodiments of the present disclosure includes that the forward and aft stiffening rib each defines a stiffened wall thickness between about 0.45-0.65 inches (11.43-16.51 mm).

A further embodiment of any of the foregoing embodiments of the present disclosure includes that the shaft defines a nominal wall thickness between about 0.3-0.4 inches (7.62-12.7 mm).

A gas turbine engine according to one disclosed non-limiting embodiment of the present disclosure includes an outer shaft that interconnects a high pressure compressor and a high pressure turbine; an inner shaft that interconnects a low pressure compressor and a low pressure turbine, the inner shaft concentric with the outer shaft along the engine central longitudinal axis, the inner shaft comprises a forward stiffening rib located axially proximate a second stage of the high pressure compressor and an aft stiffening rib located axially proximate the eighth stage of the high pressure compressor.

A further embodiment of any of the foregoing embodiments of the present disclosure includes that the forward and aft stiffening rib each defines a stiffened wall thickness between about 0.45-0.65 inches (11.43-16.51 mm) and the inner shaft defines a nominal wall thickness between about 0.3-0.4 inches (7.62-12.7 mm).

A further embodiment of any of the foregoing embodiments of the present disclosure includes that the forward and aft stiffening rib are each about 2-4 inches (50.8-101.6 mm) in axial length separated by between about 4-10 inches (101.6-254 mm).

A further embodiment of any of the foregoing embodiments of the present disclosure includes that the inner shaft drives a fan through a geared architecture.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
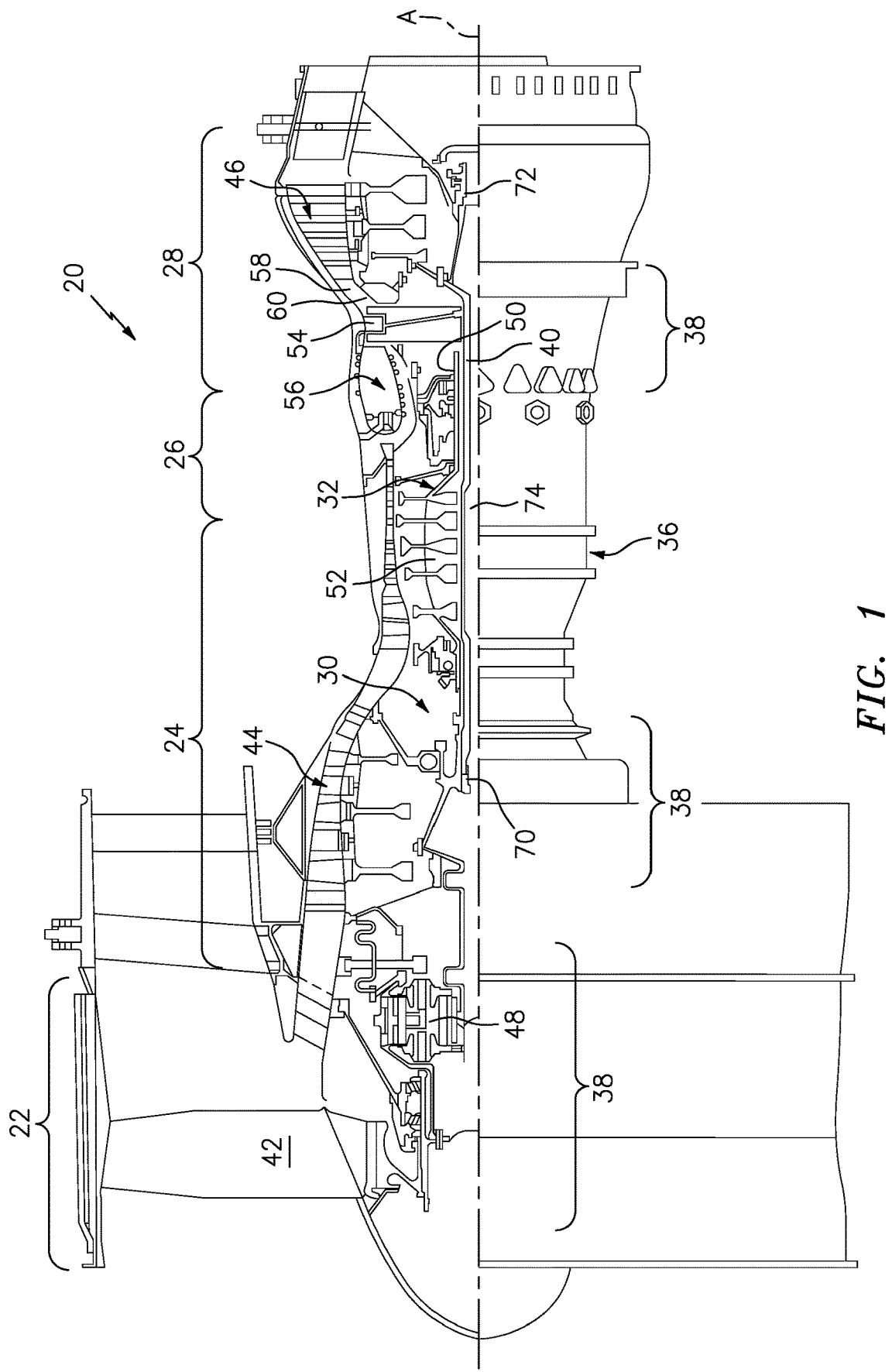
FIG. 1 is a schematic cross-section of an example gas turbine engine architecture.

FIG. 1 schematically illustrates a gas turbine engine 20. The gas turbine engine 20 as disclosed herein is a two spool turbofan that generally incorporates a fan section 22, a compressor section 24, a combustor section 26, and a turbine section 28. The fan section 22 drives air along a bypass flowpath and into the compressor section 24 to compress air within a high temperature core flowpath for communication into the combustor section 26, then expansion through the turbine section 28. Although depicted as a high bypass gas turbofan engine architecture in the disclosed non-limiting embodiment, it should be appreciated that the concepts described herein are not limited only thereto and may have application to various engine architectures.

The engine 20 generally includes a low spool 30 and a high spool 32 mounted for rotation around an engine central longitudinal axis A relative to an engine static structure 36 through bearing systems 38. The low spool 30 generally includes an inner shaft 40 that interconnects a fan 42, a low pressure compressor 44 and a low pressure turbine 46. The inner shaft 40 drives the fan 42 directly or through a geared architecture 48 to drive the fan 42 at a lower speed than that of the inner shaft 40. The high spool 32 includes an outer shaft 50 that interconnects a high pressure compressor 52 and high pressure turbine 54. The inner shaft 40 and the outer shaft 50 are concentric and rotate around the engine central longitudinal axis A.

A combustor 56 is arranged between the high pressure compressor 52 and the high pressure turbine 54. A mid-turbine frame 58 of the engine static structure 36 is arranged generally between the high pressure turbine 54 and the low pressure turbine 46. The mid-turbine frame 58 supports a bearing system 38 in the turbine section 28 as well as inlet guide vanes 60 to decrease the length of the low pressure turbine 46.

In one disclosed embodiment, the gas turbine engine 20 may have a bypass ratio greater than about six (6) to about ten (10). The example geared architecture 48 may include an epicyclical gear train, such as a planetary gear system, star gear system or other gear system, with an example gear reduction ratio of greater than about 2.3 to drive the fan 42. In this embodiment, the low pressure turbine 46 includes three (3) to six (6) turbine rotors. A ratio between the number of fan blades and the number of low pressure turbine rotors may be between about 3.3-8.6.

The low pressure turbine 46 provides the driving power to rotate the fan section 22 such that the relationship between the number of turbine rotors in the low pressure turbine 46 and the number of fan blades 42 in the fan section 22 provide increased power transfer efficiency. The pressure ratio of the low pressure turbine 46 is measured prior to an inlet of the low pressure turbine 46 as related to the pressure measured at the outlet of the low pressure turbine 46 prior to an exhaust nozzle. One example low pressure turbine 46 has a pressure ratio that is greater than about five (5).

A significant amount of thrust is provided by the bypass flow due to the high bypass ratio. The fan section 22 of the engine 20 may be designed for a particular flight condition—typically cruise at about 0.8 Mach and about 35,000 feet. The flight condition of 0.8 Mach and 35,000 ft., with the engine at its best fuel consumption, also known as bucket cruise thrust specific fuel consumption, is the industry standard parameter of pound-mass of fuel per hour being burned, divided by pound-force of thrust the engine produces at that minimum point.

Fan pressure ratio is the pressure ratio across the fan blade alone, without a fan exit guide vane system. A low fan pressure ratio as disclosed herein according to one non-limiting embodiment may be less than about 1.50 to 1.45. Corrected fan tip speed is the actual fan tip speed in ft/sec divided by an industry standard temperature correction of $[(Tram° R)/(518.7° R)]^{0.5}$. A low corrected fan tip speed, as disclosed herein according to one non-limiting embodiment, may be less than about 1150 ft/second.

The inner shaft 40 is the primary load and torque bearing member for the low spool 30. The inner shaft 40 includes a forward section 70, an aft section 72 and a middle section 74 therebetween along the engine central longitudinal axis A. The forward section 70 and the aft section 72 may include a series of forward and aft cooling holes to allow for the supply of cooling air to respective bearing systems 38. The forward section 70 and the aft section 72 may also include a series of interference snaps and splines for interconnection of the inner shaft 40 to respective components.

Figure 2:
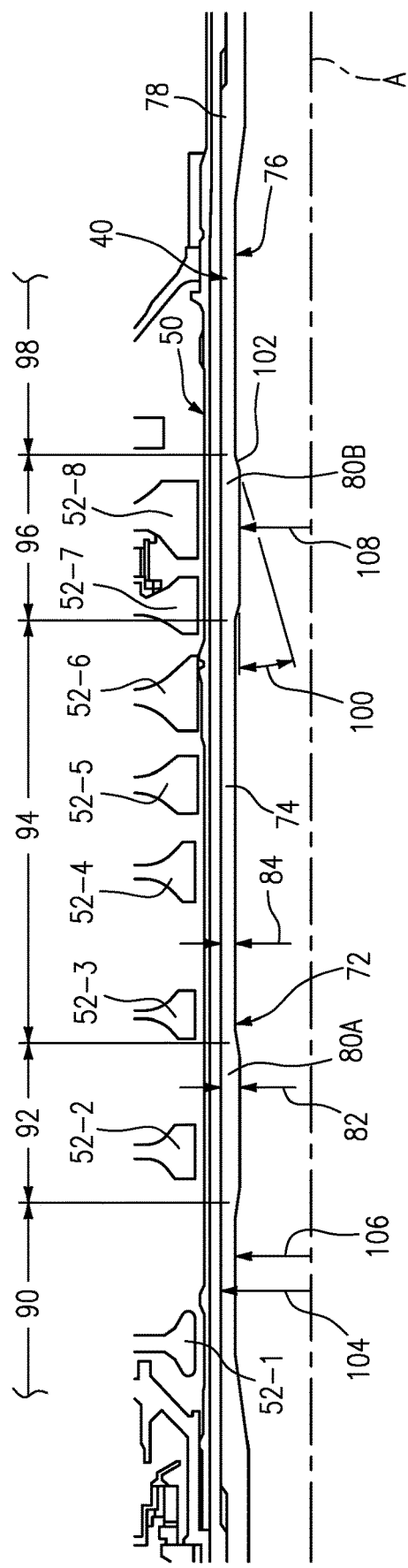
FIG. 2 is an expanded view of a rotor assembly of the gas turbine engine according to one disclosed non-limiting embodiment.

With reference to FIG. 2, the inner shaft 40 forms a torque tube with an inner contour 76 and an outer contour 78. The outer contour 78 may be generally circular as the outer contour 78 of the inner shaft 40 fits closely within the outer shaft 50. The inner contour 76 includes one or more stiffening ribs 80 (two shown as 80A and 80B) that define a stiffened wall thickness 82 that is thicker than a nominal wall thickness 84 at axial locations other than the axial locations of the stiffening ribs 80.

Figure 3:
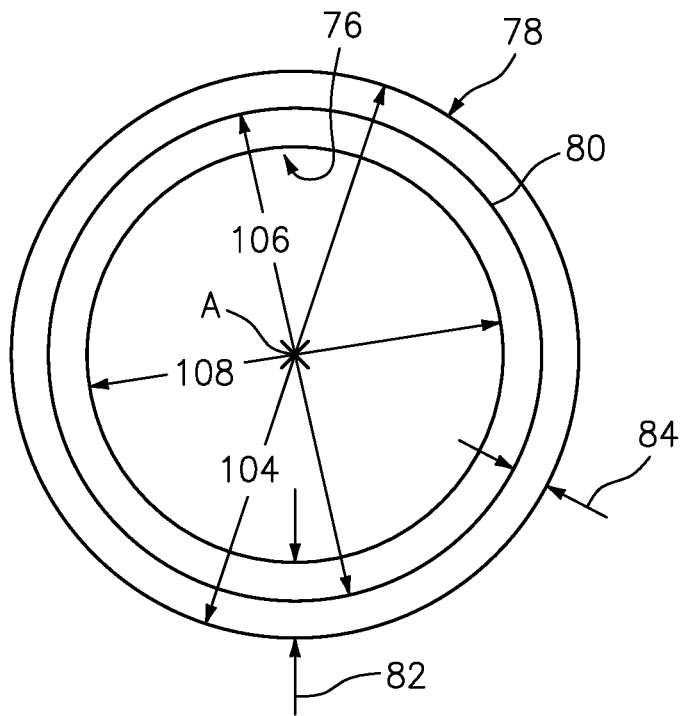
FIG. 3 is a lateral cross-sectional view of a rotor shaft illustrating a shaft stiffening rib according to one disclosed non-limiting embodiment.
Figure 4:
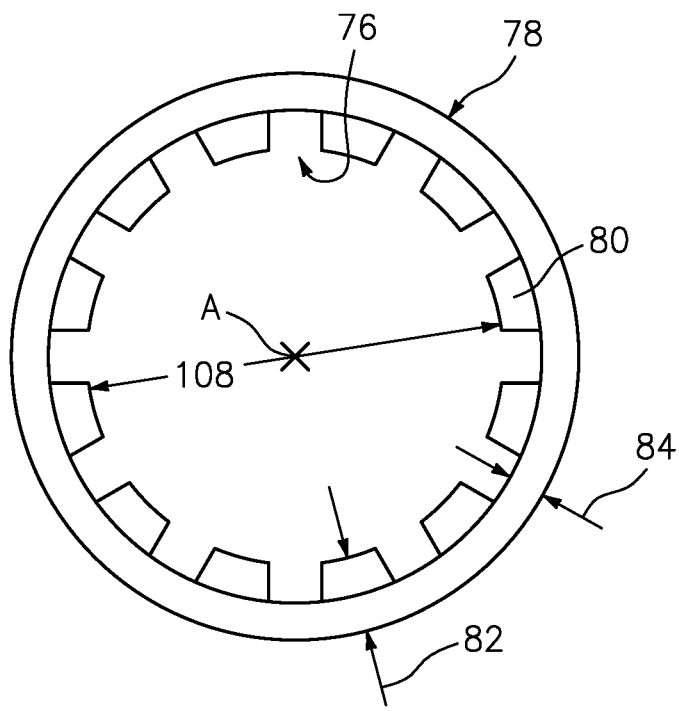
FIG. 4 is a lateral cross-sectional view of a rotor shaft illustrating a shaft stiffening rib according to another disclosed non-limiting embodiment.

In one embodiment, the stiffening ribs 80 are solid rings of additional material to form the stiffened wall thickness 82 (FIG. 3). In another embodiment, the stiffening ribs 80 are longitudinal splines of additional material disposed along axis A to form the stiffened wall thickness 82 (FIG. 4).

In one disclosed non-limiting embodiment, the stiffening ribs 80A, 80B are axially located with respect to the stages of the high pressure compressor 52. The stages of the high pressure compressor 52 include, in this embodiment, eight stages 52-1 to 52-8 (FIG. 2). Each stage 52-1 to 52-8 is defined axially herein by a rotor disk of the high pressure compressor 52. In this embodiment, the forward stiffening rib 80A may be located axially proximate the second stage 52-2 and the aft stiffening rib 80B may be located axially proximate the seventh stage 52-7 and/or the eight stage 52-8. The aft stiffening rib 80B may axially span at least a portion of the seventh stage 52-7 and eighth stage 52-8.

In one disclosed non-limiting dimensional embodiment, the inner shaft 40 is approximately 60 inches (1524 mm) long. The forward stiffening rib 80A may be located at a distance 90 of about 21 inches (533 mm) from a distal end of the forward section 70 and may be of an axial length 92 of about 2-4 inches (50.8-101.6 mm). The middle section 74 from the forward stiffening rib 80A to the aft stiffening rib 80B may span a distance 94 of about 4-10 inches (101.6-254 mm) in axial length, and the aft stiffening rib 80B may be of an axial length 96 of about 2-4 inches (50.8-101.6 mm). That is, in one embodiment, the forward stiffening rib 80A and the aft stiffening rib 80B are each about 2-4 inches (50.8-101.6 mm) in axial length and are separated by between about 4-10 inches (101.6-254 mm).

From an aft end of the aft stiffening rib 80B to a distal end of the aft section 72 may span a distance 98 of about 25 inches (635 mm) in axial length. Each of the stiffening ribs 80A, 80B may have an angular taper 100 in the range of 20-45 degrees between the stiffened wall thickness 82 and the nominal wall thickness 84. The intersection of the angular taper 100 with the nominal wall thickness 84 at each end of each stiffening rib 80 may include an associated radii 102 of 0.125-0.250 inches (3.175-6.35 mm). It should be appreciated that the specific dimensions are exemplary and may be different based on engine size, configuration and operational requirements.

In this embodiment, the outer contour 78 may be approximately 3.7 inches (93.98 mm) in diameter 104 (See FIG. 2). A nominal wall thickness inner diameter 106 at the nominal wall thickness 84 of the inner contour 76 may be about 3.1 inches (78.74 mm), and a stiffened wall thickness inner diameter 108, at the stiffened wall thickness 82 of the inner contour 76 may be about 2.8 inches (71.12 mm). In this embodiment, the stiffened wall thickness 82 may be between about 0.45-0.65 inches (11.43-16.51 mm) and more particularly 0.5 inches (12.7 mm) as compared to the nominal wall thickness 84 between about 0.3-0.4 inches (7.62-12.7 mm), and more particularly 0.4 inches (12.7 mm). In this dimensional embodiment, the stiffened wall thickness 82 may be related to the nominal wall thickness 84 according to an example ratio of about 1.125-2.1. In another example, the ratio between the stiffened wall thickness 82 to the nominal wall thickness 84 may be about 1.25. It should be appreciated that these specific dimensions are exemplary and may be different based engine size, configuration and operational requirements.

The stiffening ribs 80 provide an increase in the bending stiffness capability of the shaft while decreasing shaft weight. The stiffening ribs 80 reduce mid-shaft torque tube deflection while minimizing shaft thickness throughout a length of the inner shaft. The stiffening ribs 80 provide an increase in the bending stiffness capability of the shaft while decreasing weight. In one embodiment, the stiffening ribs 80 provide a weight decreases of about 10% while shaft stiffness remains about equal without stiffening ribs, i.e., a shaft having a wall thickness corresponding to the stiffened wall thickness 82. The stiffening ribs are located to minimize shaft deflection based on the shaft design and boundary conditions in the engine, e.g., temperature, speed, loads, etc. The stiffening ribs 80 may be of a specific location, thickness, length, and count to achieve this minimized deflection for the particular shaft application.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A shaft for a gas turbine engine, comprising:
   an inner contour with a stiffening rib that defines a stiffened wall thickness related to a nominal wall thickness according to a ratio between about 1.125-2.1, wherein the stiffening rib comprises a longitudinal spline of additional material disposed along an axis A to form the stiffened wall thickness.

2. The shaft as recited in claim 1, wherein the stiffening rib is located axially proximate a second stage of a high pressure compressor.

3. The shaft as recited in claim 1, wherein the stiffening rib is located axially proximate a seventh stage of the high pressure compressor.

4. The shaft as recited in claim 1, wherein the stiffening rib is located axially proximate an eighth stage of the high pressure compressor.

5. The shaft as recited in claim 1 wherein the stiffening rib is located axially proximate a seventh and an eighth stage of the high pressure compressor.

6. The shaft as recited in claim 1, wherein the stiffened wall thickness is between about 0.45-0.65 inches (11.43-16.51 mm).

7. The shaft as recited in claim 1, wherein the nominal wall thickness is between about 0.3-0.4 inches (7.62-12.7 mm).

8. The shaft as recited in claim 1, wherein the stiffening rib comprises a multiple of longitudinal splines.

9. The shaft as recited in claim 1, wherein the stiffening rib is about 2-4 inches (50.8-101.6 mm) in axial length.

10. The shaft as recited in claim 1, wherein the stiffening rib comprises a forward and aft stiffening rib, wherein each stiffening rib is about 2-4 inches (50.8-101.6 mm) in axial length separated by between about 4-10 inches (101.6-254 mm).

11. The shaft as recited in claim 1, wherein the shaft is a low pressure turbine shaft.

12. A low pressure turbine shaft for a gas turbine engine, comprising:
    an inner contour with a forward stiffening rib located axially proximate a second stage of a high pressure compressor and an aft stiffening rib located axially proximate an eighth stage of the high pressure compressor wherein each of the forward stiffening rib and the aft stiffening rib comprises a longitudinal spline of additional material disposed along an axis A.

13. The low pressure turbine shaft as recited in claim 12, wherein the forward and aft stiffening rib are each about 2-4 inches (50.8-101.6 mm) in axial length separated by between about 4-10 inches (101.6-254 mm).

14. The low pressure turbine shaft as recited in claim 12, wherein the forward and aft stiffening rib each defines a stiffened wall thickness between about 0.45-0.65 inches (11.43-16.51 mm).

15. The low pressure turbine shaft as recited in claim 14, wherein the shaft defines a nominal wall thickness between about 0.3-0.4 inches (7.62-12.7 mm).

16. A gas turbine engine, comprising:
a high pressure compressor;
a high pressure turbine;
an outer shaft along an engine central longitudinal axis, the outer shaft interconnects the high pressure compressor and the high pressure turbine;
a low pressure compressor;
a low pressure turbine;
an inner shaft that interconnects the low pressure compressor and the low pressure turbine, the inner shaft concentric with the outer shaft along the engine central longitudinal axis, the inner shaft comprises a forward stiffening rib located axially proximate a second stage of the high pressure compressor and an aft stiffening rib located axially proximate the eighth stage of the high pressure compressor, wherein each of the forward stiffening rib and the aft stiffening rib comprises a longitudinal spline of additional material disposed along an axis A.

17. The gas turbine engine as recited in claim 16, wherein the forward and aft stiffening rib each defines a stiffened wall thickness between about 0.45-0.65 inches (11.43-16.51 mm) and the inner shaft defines a nominal wall thickness between about 0.3-0.4 inches (7.62-12.7 mm).

18. The gas turbine engine as recited in claim 17, wherein the forward and aft stiffening rib are each about 2-4 inches (50.8-101.6 mm) in axial length separated by between about 4-10 inches (101.6-254 mm).

19. The gas turbine engine as recited in claim 18, wherein the inner shaft drives a fan through a geared architecture.

* * * * *